United States Patent [19]

Roemersma

[11] Patent Number: 5,450,348
[45] Date of Patent: Sep. 12, 1995

[54] DIGITIZING DEVICE

[75] Inventor: Henk Roemersma, Elmshorn, Germany

[73] Assignee: Aristo Graphic Systeme GmbH & Co. KG, Hamburg, Germany

[21] Appl. No.: 200,104

[22] Filed: Feb. 22, 1994

[30] Foreign Application Priority Data

Feb. 26, 1993 [DE] Germany .................. 43 06 855.3

[51] Int. Cl.6 .............................................. G08C 21/00
[52] U.S. Cl. .................................. 364/480; 364/188; 179/18; 341/5; 345/179
[58] Field of Search ................. 364/480, 188; 179/18, 179/19, 20; 341/5; 345/179

[56] References Cited

U.S. PATENT DOCUMENTS

| | | | |
|---|---|---|---|
| 3,668,313 | 6/1972 | Dym | 178/19 |
| 4,054,746 | 10/1977 | Kamm | 178/19 |
| 4,080,515 | 3/1978 | Anderson | 178/19 |
| 4,088,842 | 5/1978 | Ikedo | 178/19 |
| 4,552,991 | 11/1985 | Hulls | 178/19 |
| 4,705,919 | 11/1987 | Dhawan | 178/19 |
| 4,794,209 | 12/1988 | Asada et al. | 178/19 |
| 4,855,538 | 8/1989 | Jocob-Grinschgl et al. | 178/18 |
| 5,051,545 | 9/1991 | McDermott | 178/19 |
| 5,134,253 | 7/1992 | Doubrva | 178/19 |
| 5,245,336 | 9/1993 | Chen et al. | 178/18 |
| 5,345,044 | 9/1994 | Landmeier | 178/19 |

FOREIGN PATENT DOCUMENTS 0513559 11/1992 European Pat. Off. .
3544673 6/1987 Germany .

Primary Examiner—Ellis B. Ramirez
Assistant Examiner—Kyle J. Choi
Attorney, Agent, or Firm—Fitzpatrick, Cella, Harper & Scinto

[57] ABSTRACT

A digitizing device includes a digitizing tablet having, for each of the two coordinate directions, a first grid winding divided into regularly repeated strip conductor groups and a second grid winding divided into regularly repeated strip conductor groups which are offset with respect to each other at different spacings over the entire work surface. A trigger circuit charges the grid windings with periodic signals in a predetermined sequence, the charges following each other essentially without interruption. However, an interruption time period is provided between the end of charging the grid windings for the other coordinate direction and the start of charging of the grid winding for the one coordinate direction. A scanning coil to be placed upon the digitizing table is connected to an evaluating circuit. The evaluating circuit and the trigger circuit galvanically are separated from each other and operate independently of each other. The evaluating circuit determines the start of charging the grid winding for the one coordinate direction from the end of the interruption time period. The evaluating circuit determines the position of the scanning coil upon the digitizing tablet from the phase difference of the signals of the grid windings for the respective coordinate directions.

18 Claims, 4 Drawing Sheets

| Xh | X | A | Y | B | Xh | X | A | Y | B | Xh | X | A | Y | B | Xh | X | A | Y | B |

Fig. 4

| Xh | X | A | $\bar{X}$ | Y | B | $\bar{Y}$ | Xh | X | A | $\bar{X}$ | Y | B | $\bar{Y}$ | Xh | X | A | $\bar{X}$ | Y | B | $\bar{Y}$ | Xh | X | A | $\bar{X}$ | Y | B | $\bar{Y}$ |

Fig. 5

DIGITIZING DEVICE

BACKGROUND OF THE INVENTION

1. Field of Invention

The invention relates to a digitizing device with a digitizing tablet having, for each of the two coordinate directions, a first grid winding divided into regularly repeated strip conductor groups and a second grid winding divided into regularly repeated strip conductor groups. These first and second grid windings are arranged in such a way that the first strip conductors of adjoining strip conductor groups of these first and second grid windings have different spacings in the associated coordinate direction over the entire work surface. A predetermined sequence of periodic signals is applied to the grid windings for the one coordinate direction by a trigger circuit. For a predetermined length of time, a first signal is applied to the first end of the first grid winding; and for an immediately following second predetermined period of time, a second signal is applied to the first end of the second grid winding. Immediately following the triggering of the grid windings for the one coordinate direction, the grid windings for the other coordinate direction are triggered in the same manner. The device also includes a scanning coil which can be placed on the digitizing tablet. The signals induce voltages in the scanning coil which are supplied to an evaluating circuit for detecting the position of the scanning coil on the digitizing tablet.

2. Brief Description of the Prior Art

In a known digitizing device of this type (German Patent DE-PS 35 44 673), one of the grid windings is used for performing a rough measurement, and the other is used for performing a fine measurement. The grid windings are triggered with periodic digital pulse sequences, so that during the digitizing operation signals are always applied to one of the grid windings. The trigger circuit and the evaluating circuit thereby cooperate in such a way that the evaluating circuit directly receives information relating to the start of the application of a signal to the respective grid winding. Thus, from the phase shift of the crossovers it is possible to detect the strip conductors of the first grid winding in the area of which the scanning coil is located. This phase difference represents a defined value determining the respective strip conductor group of the first grid winding, because the distances between the strip conductor groups of the first and second grid windings are different. The evaluating circuit determines an exact position, within the previously determined strip conductor group of the second grid winding, from the crossover of the signal of the second grid winding, and thus determines an exact position of the scanning coil upon the work surface for a first coordinate direction. A determination of the position of the scanning coil in the second coordinate direction upon the work surface is performed in the same fashion.

The known digitizing device operates extremely satisfactorily and exactly, but requires the direct cooperation of the trigger circuit and the evaluating circuit. Thus, the digitizing tablet and the scanning coil must essentially represent a connected component.

OBJECT AND SUMMARY OF THE INVENTION

It is an object of the invention to provide a digitizing device structure which is simpler in its technical application.

To attain this object, a digitizing device of the previously mentioned type is designed in accordance with the invention in such a way that the trigger circuit is associated with the digitizing tablet. The evaluating circuit also is associated with the scanning coil in such a way that the trigger and evaluating circuits are galvanically separated and operate independently of each other. An interruption time period is provided between the end of triggering of the grid windings for a second coordinate direction and the start of triggering of the grid windings for a first coordinate direction, so that the evaluating circuit can determine the start of triggering of the grid windings for a first coordinate direction. The evaluating circuit then determines the phase difference of the first and second signals of the grid windings for the two respective coordinate directions in order to determine the position of the scanning coil on the digitizing tablet.

For a digitizing device according to the invention, a digitizing tablet including a trigger circuit, and a scanning coil including the evaluating circuit are galvanically separated from each other, so that a separate spatial construction is possible. In this manner, it is possible to embody the digitizing tablet in a very flat and compact form, because it only needs to contain the trigger circuit. The evaluating circuit can be provided at another place, perhaps as a part of the circuitry within an associated PC (personal computer) to which the scanning coil is connected as an input device. The lack of the association of functions, and thus the lack of knowledge of the evaluating circuit regarding the time of application of signals to the various grid windings, is corrected in accordance with the invention in that the application of signals to the various grid windings takes place in an exactly fixed, predetermined sequence. Although signals to the grid windings for the first and second directions follow each other closely, and triggering of the grid windings for the second coordinate direction takes place immediately following triggering of the grid windings for the first direction, an interruption time period is provided prior to the start of triggering of the first grid winding. Thus, if during evaluation of the voltages induced by the signals in the scanning coil, the evaluating circuit detects this interruption time period or the start of signals following the end of this interruption time period, the circuit can identify the signal appearing immediately following the end of the interruption time period as the signal on the first grid winding for the first coordinate direction. The evaluating circuit thereafter also can identify the signals following it. In this way the "starting time" for the evaluating process is known. This relationship permits the circuit to draw conclusions regarding the grid winding, and the signal from which is intended to be evaluated.

Following this determination, it is then possible to determine the phase difference between the first and second signals of the grid windings of the respective coordinate directions. It is then possible to draw conclusions from the phase difference regarding the position of the scanning coil on the digitizing tablet. This is accomplished since, as previously mentioned, a phase difference definitely can be associated with a position on the digitizing tablet since distances between strip conductors of a first and a second grid winding are different over the dimensions of the work surface of the digitizing tablet.

As a rule, a voltage will be induced in a scanning coil which, at the start of the time for the signal, displays a certain transient response. An induced voltage at first has a shape that does not directly reflect the actual signal shape, which is only achieved after a certain transition time. The scanning coil of the evaluating circuit first supplies a distorted signal, which is difficult to evaluate, during the transition of the evaluation from a signal on one grid winding to a signal on the next grid winding. Therefore, such a transition may be interpreted by the evaluating circuit as the start of the signal on the first grid winding for the first coordinate direction, which can also display certain transient responses. To prevent such a possibly faulty evaluation, a periodic auxiliary signal can be applied to the first grid winding for the one coordinate direction during the interruption time period. The frequency of this auxiliary signal can be half of that of the first signal, for example.

The transition from the auxiliary signal on the first grid winding to the first signal on the first grid winding induces a voltage in the scanning coil. The shape of this voltage is clearly different from the shape of that which occurs with a transition from a signal on a grid winding to a signal on another grid winding. In this way the evaluating circuit is in a position to determine the end of the interruption time period, and thus the start of the application of the first signal to the first grid winding for the first coordinate direction, without difficulty.

As already mentioned above, the position of the scanning coil with respect to respective coordinate directions is determined by detecting a phase shift between voltages generated in the scanning coil by the first and second signals, since the size of this phase shift definitely represents the position on the digitizing tablet. However, this process results in a certain inaccuracy. The path of the first signal in the grid winding for a first coordinate direction as detected by the scanning coil will contain a certain error because of circuit properties and the like. To compensate for such errors, it is preferred to apply a third signal to the first grid winding for each of the two coordinate directions for a predetermined length of time, immediately following the application of a second signal to the second end of the associated second grid winding.

In this manner, not only does a first signal applied to the first end pass through the first grid winding for each of the coordinate directions, but so also does a further signal applied to the opposite end of the first grid winding. The resulting voltages induced in the scanning coil can be averaged in the evaluating circuit, so that the effects of errors because of circuit design, as well as errors because of the inaccurate determination of the end of the interruption time periods, are compensated with respect to each other. The exact position of the crossover of the voltage induced by the first signal, and thus also the exact size of the phase shift between voltages induced by the first and second signals also can be determined. In this way, an actual position of a scanning coil upon a digitizing tablet can be determined with increased accuracy.

The evaluation of the signals applied to the grid windings is simplified if the form and frequency of all signals, as well as the time periods during which they are applied to the grid windings, are all the same. Preferably, each time period includes four periods of applied signal, so that there will be sufficient response time and a voltage induced by the third period of the signal can be evaluated in the evaluating circuit.

The invention will be described further and in detail below, wherein reference is made to the accompanying drawings.

BRIEF DESCRIPTION OF THE DRAWINGS

FIG. 4 schematically illustrates the signal sequence for triggering the grid windings for the first and a second coordinate directions.

FIG. 5 shows a modified signal sequence for triggering the grid windings for the first and a second coordinate directions.

DETAILED DESCRIPTION OF THE PREFERRED EMBODIMENTS

Figure 1:
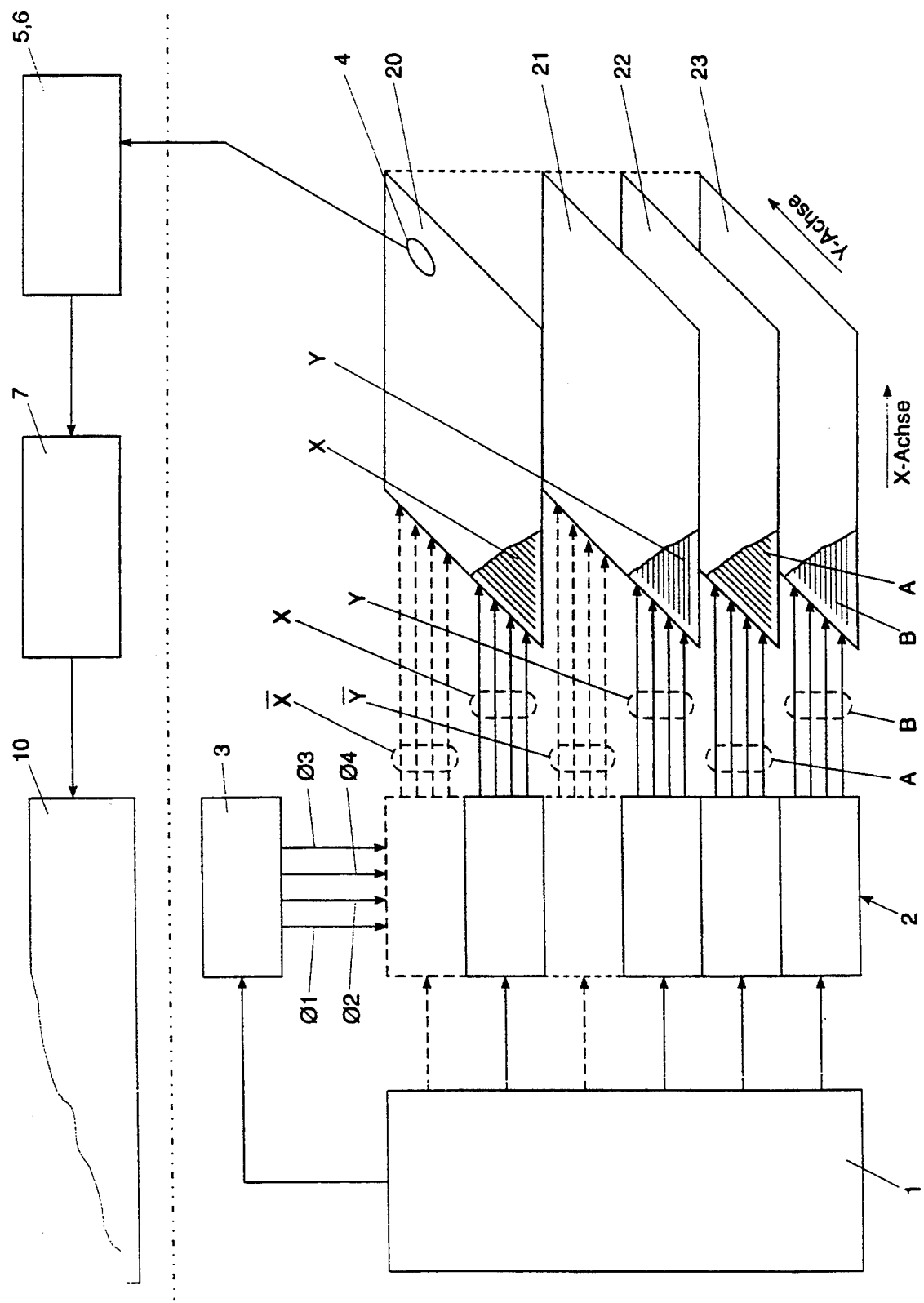
FIG. 1 schematically illustrates the structure of a digitizing device, according to the present invention.
Figure 2:
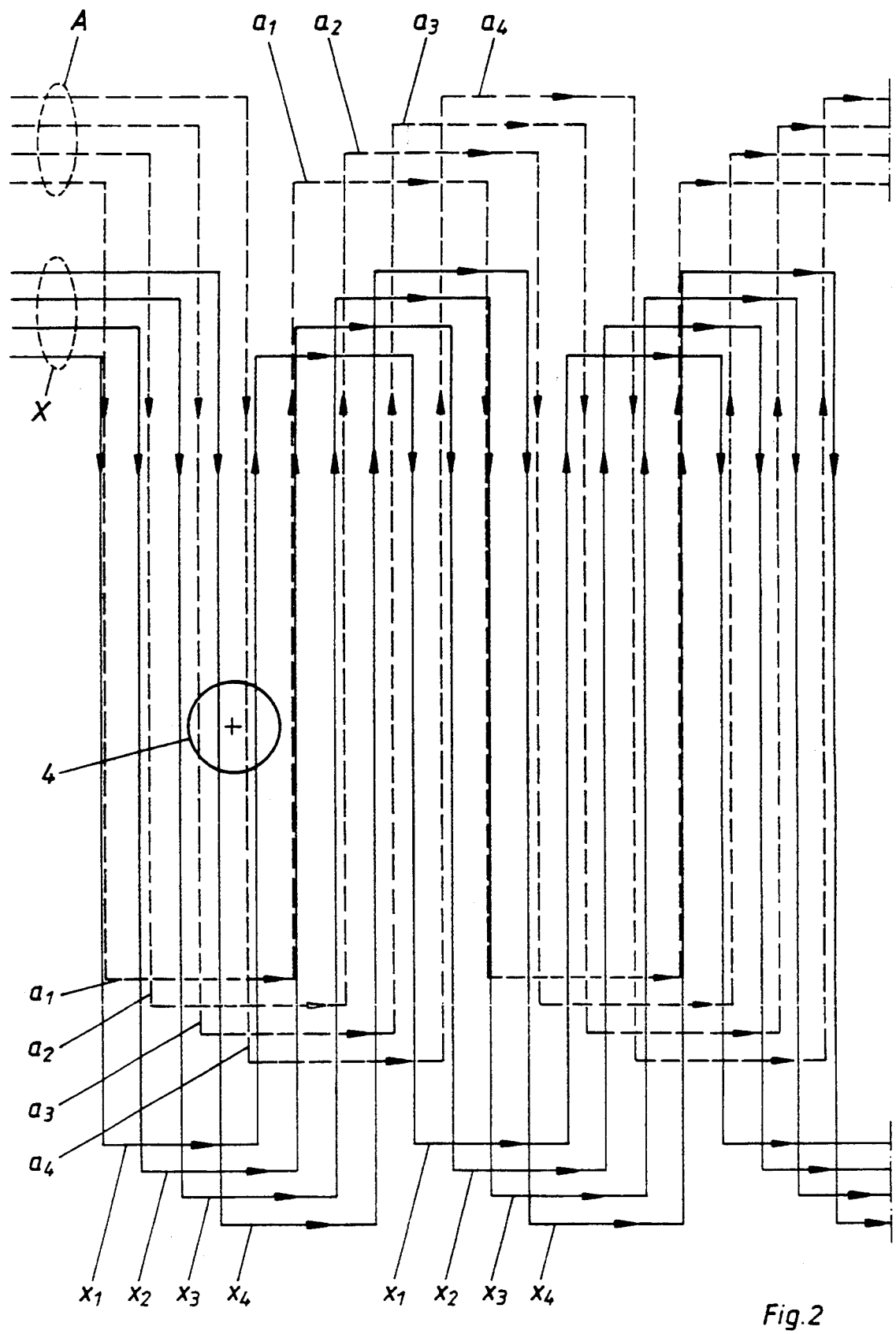
FIG. 2 shows the course and the arrangement of strip conductors and first and second grid windings, according to FIG. 1.

To a large degree the digitizing device shown schematically by FIGS. 1 and 2 corresponds to that conventional structure illustrated by German Patent DE-PS 35 44 673. Triggering of the digitizing tablet containing the grid windings of the planes 20, 21, 22, and 23, as shown in FIGS. I and 2, therefore can be accomplished in the conventional manner.

Referring to FIGS. 1 and 2, the digitizing tablet shown contains four grid windings X, Y, A, and B. As will be described below, each one of these grid windings contains strip conductor groups of respectively four strip conductors, which are triggered by a driver stage 2. Via a phase shifting circuit 3, the driver stage 2 is supplied via four wires with phase-shifted rectangular pulses $\phi_1$, $\phi_2$, $\phi_3$, $\phi_4$, phase shifted by 45° and all of a length of 180°, by a trigger circuit 1, which is, for example, in the form of a microprocessor.

As shown in FIG. 1, the strip conductors of the grid winding X located in the plane 20 extend vertically with respect to the X-axis. The strip conductors of the grid winding Y located in the plane 21 extend vertically with respect to the Y-axis. The strip conductors of the grid winding A are located in the plane 22 and extend parallel to the strip conductors of the grid winding X, while the strip conductors of the grid winding B extend m the plane 23 parallel to the strip conductors of the grid winding Y. The parallel planes 20, 21, 22, and 23 have been drawn at a large distance from each other for clarity only. They are normally located close together, and the various grid windings are separated from each other only by thin layers of insulating material.

The paths for strip conductors of the grid winding X and of the grid winding A schematically are illustrated in a somewhat simplified manner in FIG. 2. As can be seen, the strip conductors $x_1$, $x_2$, $x_3$, and $x_4$ of the grid winding X all have the same spacing from each other, i.e. the spacing of the strip conductors within a strip conductor group made of these strip conductors is constant. In the exemplary embodiment illustrated, the spacing between the last strip conductor of a group from the first strip conductor of the following group is also constant. The adjoining strip conductor groups differ in that they conduct the applied currents in opposite directions as indicated by the arrows in FIG. 2.

It should be mentioned that in FIG. 2 only the beginning of strip conductors located in the area of the connections with the driver circuit 2 is shown. These conductors extend over the entire width in the direction of the X-axis of the digitizing tablet 1. As customary, the conductors are reversed at the end and returned to the current supply side, guided above the strip conductors shown.

The corresponding part of the grid winding A, which has a strip conductor group with four strip conductors $a_1$, $a_2$, $a_3$, and $a_4$, respectively, also is shown in FIG. 2. The strip conductors of one strip conductor group have the same distance from each other. In addition, the distance between the last strip conductor $a_4$ of a group and the first strip conductor $a_1$ of the following group is the same. The strip conductors of the grid winding A are shown in dashed lines. As can be seen, the spacing between adjoining strip conductors of the grid winding X is clearly less than the spacing between adjoining strip conductors of the grid winding A. Thus, in this case, the digitizing tablet contains a larger number of strip conductors or strip conductor groups of the grid winding X than of strip conductors or strip conductor groups of the grid winding A. In this way it is achieved that, counting from the first strip conductor group which is connected with the current supply of each of the two grid windings X and A, the strip conductors of the groups numbered the same of the grid windings X and A always have a different spatial distance from each other. Such a spatial relationship also is shown in German Patent DE-PS 35 44 673.

For conducting a measurement, the strip conductors of the grid winding X and of the grid winding A are supplied, in a sequence which will be described below, periodically with phase-shifted signals in the form of rectangular pulses $\phi_1$, $\phi_2$, $\phi_3$ and $\phi_4$, which are sketched at the top of FIG. 3. As illustrated, these rectangular pulses have a length of 180°, so that first there are created four rising successive pulse flanks displaced by 45° with respect to each other. Moreover, 45° after the last rising pulse flank, there are four descending pulse flanks respectively displaced by 45° with respect to each other. Moreover, 45° later four rising pulse flanks respectively displaced by 45° again appear.

The pulses $\phi_1$ are first supplied by the driver stage 2 to the strip conductor $x_1$ of the grid winding X; the pulses $\phi_2$ are supplied to the strip conductor $x_2$ of the grid winding X; the pulses $\phi_3$ are supplied to the strip conductor $x_3$ of the grid winding X; and the pulses $\phi_4$ are supplied to the strip conductor $x_4$ of the grid winding X.

Figure 3:
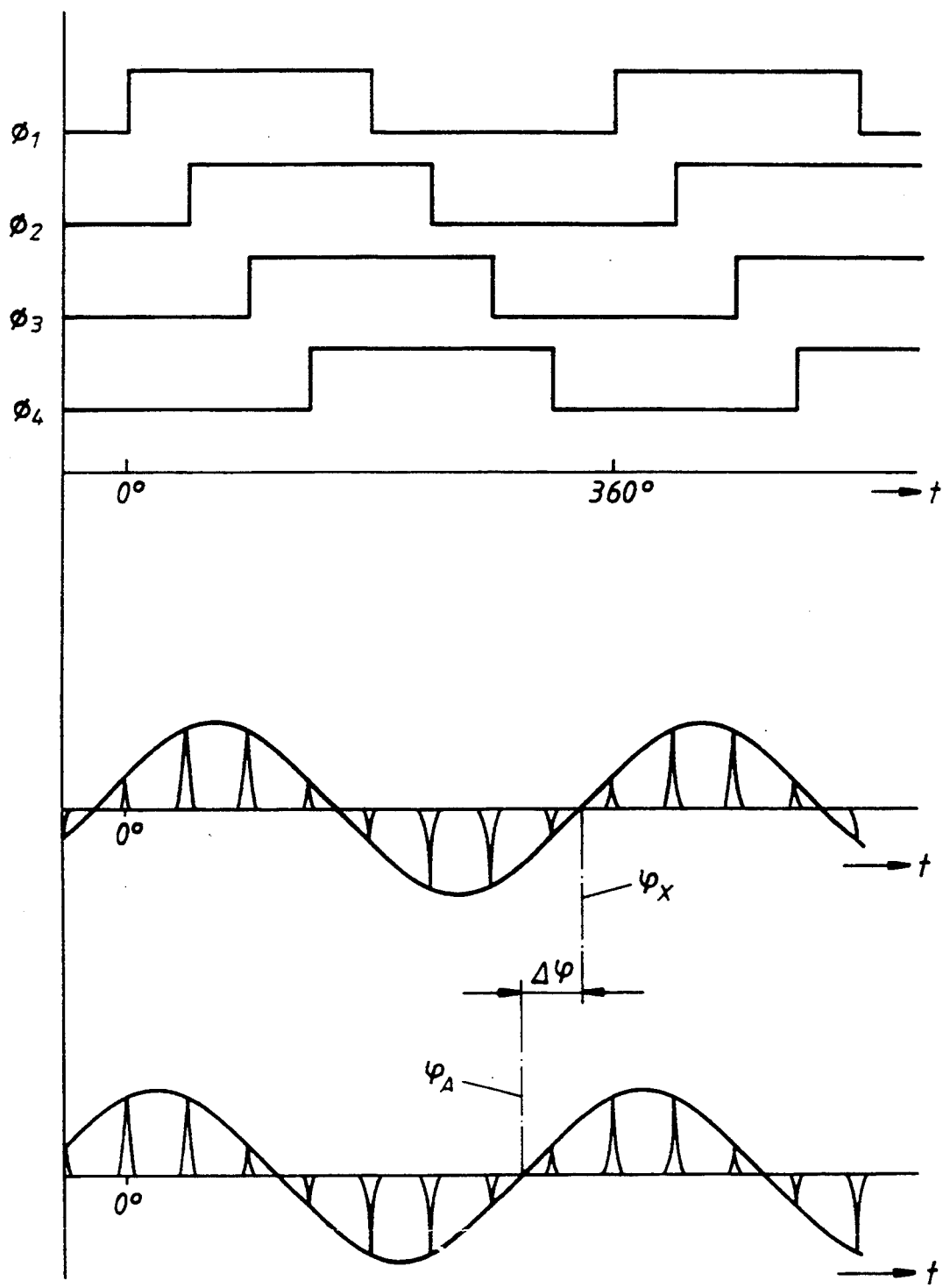
FIG. 3 shows in the upper part the signals applied to a grid winding, and in the lower parts the voltage pulses induced in the scanning coil and the sinusoidal signals derived therefrom.

A periodic signal or pulse sequence, as indicated at the top of FIG. 3, passes in this way through the strip conductors of the grid winding X. As a result, periodic voltage pulses, which are a result of the rising and descending pulse flanks of the pulses $\phi_1$ to $\phi_4$, are induced in the scanning coil 4, as indicated in the middle of FIG. 3. As shown in FIG. 2, the center of scanning coil 4 is located between the strip conductor $x_4$ of the first strip conductor group of the grid winding X and the strip conductor $a_4$ of the strip conductor group of the grid winding A. The voltage pulses induced by means of the grid winding are shown in the middle of FIG. 3. The association to the generated pulses $\phi_1$ to $\phi_4$, which are shown at the top of FIG. 3, can also be seen in the middle of FIG. 3. Thus, if pulses $\phi_1$ to $\phi_4$ are supplied to the strip conductors $x_1$ to $x_4$, corresponding voltage pulses are induced in the scanning coil 4 shown in FIG. 2. In this process, a minimum voltage pulse is generated when current is applied to a strip conductor extending underneath the center of the coil 4. Moreover, a maximum voltage pulse is generated when current is applied to a strip conductor extending underneath the edge area of the coil.

Thus, as shown in FIGS. 2 and the middle of FIG. 3, charging the line $x_4$ of the first strip conductor group and charging the line $x_1$ of the second strip conductor group of the grid winding X results in the generation of a small voltage pulse. With current directions in accordance with the arrows, this results in a negative pulse in the strip conductor $x_4$ of the first strip conductor group and a positive pulse in the strip conductor $x_1$ of the second strip conductor group. Thus, a crossover must be present between these two pulses which, at the middle of FIG. 3, is located at $\phi_x$. With a displacement of the pulses by 180°, i.e. with the said strip conductors with the reversed current flow, further crossovers occur which are respectively displaced by 180°. The pulses generated between these crossovers are the result of the remaining portions of the pulse sequences shown at the top of FIG. 3.

If the voltage pulses generated in this manner are supplied to a low-pass filter 6 via an amplifier 5 (as illustrated in FIG. 1) that is connected to the scanning coil 4, a sinusoidal generating curve of an envelope will result as indicated in the middle of FIG. 3. The crossovers in time of this curve are detected by a crossover detector 7, and are forwarded to an evaluating circuit 10, which consists, for example, of a microprocessor.

If pulses $\phi_1$, $\phi_2$, $\phi_3$, and $\phi_4$ in accordance with the top of FIG. 3 are provided by the driver stage 2 in accordance with the grid winding A, a crossover located at $\phi_A$ (bottom of FIG. 3) will result. This crossover occurs due to the position of the scanning coil 4 with respect to the grid winding A. Preferably, this position is almost in the center above the strip conductor $a_4$ of the first strip conductor group (as shown in FIG. 2), as compared to the position with respect to the grid winding X. The voltage pulses generated in the scanning coil 4 by the charge in the grid winding A are supplied via the amplifier 5 (as shown in FIG. 1) to the low-pass filter 6, thus creating the sinusoidal voltage path indicated at the bottom of FIG. 3. The crossovers of the sinusoidally shaped voltage path are recognized in the crossover detector 7 and supplied to the evaluating circuit 10.

It is also known, for example, from German Patent DE-PS 35 44 673, that when a scanning coil is "coupled" with a microprocessor controlling grid windings, it is possible to detect the position of the scanning coil on the digitizing tablet by detecting the above mentioned phase shift $\Delta\phi$ (as shown in FIG. 3). The strip conductor group of the grid winding A or B, i.e. in such a known arrangement of a grid winding for a rough measurement, can be determined in that the point in time of triggering of the respective grid winding is known. Thus, it is possible to come to a conclusion as to the strip conductor group within the grid winding A or B by means of the point in time of the corresponding voltage induction in the scanning coil.

However, as illustrated in FIG. 1, there is no "coupling" in the present invention for a digitizing device between the trigger circuit 1, which triggers the digitizing tablet, and the scanning coil 4. Instead, the scanning coil 4 is connected via the amplifier 5, the low-pass filter 6, and the crossover detector 7 with the evaluating circuit 10, which has no galvanic connection or other coupling whatever with the trigger circuit 1.

If a digitizing tablet made according to the present invention were to be triggered in the conventional manner, such as is described in German Patent DE-PS 35 44 673 by means of the trigger circuit 1 (for example, by first connecting a group of pulses $\phi_1$ to $\phi_4$ with the grid winding X; immediately followed by connecting such a group to the grid winding A; after that by connecting such a group to-the grid winding Y; and immediately following that by connecting such a group to the grid winding B; and then at the end of triggering the grid winding B, again triggering the grid winding X directly) voltage pulses would be induced in the scanning coil 4 in the same manner as previously known, for example, from German Patent DE-PS 35 44 673. Such voltage pulses also are indicated at the middle and bottom of FIG. 3. It would also be possible in the same way to detect the crossovers of the sinusoidal voltage paths in the evaluating circuit 10. However, it would not be possible to associate one of the detected voltage paths with a defined grid winding. Thus, it would also not be possible to come to a conclusion regarding the position of the scanning coil on the digitizing tablet, using such a conventional triggering.

To remove this obstacle, triggering of the grid windings is modified in the way indicated in FIG. 4. First the grid winding X, then immediately following this the grid winding A, then immediately following that the grid winding Y, and then the grid winding B are charged with the same number of pulses $\phi_1$ to $\phi_4$. However, before charging of the grid winding X is begun, an interruption time period Xh is provided. In this period, for example, the grid winding X is charged with signals which have the same shape as the pulses $\phi_1$ to $\phi_4$, but which have a frequency which is only one-half as great.

Thus, each triggering of the grid winding X is preceded by an interruption time period, while the triggering of the remaining grid windings takes place with one immediately following the other. It is possible in this way to differentiate in-the evaluating circuit 10 between triggering by means of the pulses $\phi_1$ to $\phi_4$, and the interruption time period. In the interruption time period, either no triggering of a grid winding takes place or, preferably the grid winding X is triggered by pulses $\phi_1$ to $\phi_4$ which are, however, of one-half the frequency. Thus, the evaluating circuit can determine, in the same way as known digitizing devices, (such as those illustrated by German Patent DE-PS 35 44 673), from the appearance of a transition from an interruption time period to triggering of a grid winding X with pulses $\phi_1$ to $\phi_4$, when a sequence of pulses $\phi_1$ to $\phi_4$ has just been supplied to that grid winding. The evaluating circuit then subsequently can determine the phase difference between the crossovers of the pulse sequences on the associated grid windings, i.e. on the grid windings X and A, or Y and B. The; evaluating circuit then will determine the position of the scanning coil upon the digitizing tablet from this phase difference.

It should be noted in this connection that it is possible to determine the position of a scanning coil upon a digitizing tablet from the detected phase difference alone, due to different spacing of adjoining strip conductor groups of associated grid windings on the digitizing tablet. This can be done because this phase difference corresponds to the spacing of the strip conductor groups of the two grid windings and therefore is unique for each one of the strip conductor groups.

In the above described sequence, the detection of the point in time of the start of triggering of the grid winding X by pulses is made easier in that during the interruption time period Xh, pulses of a different frequency are applied to the grid winding X. Thus, the transition from the pulses characterizing the interruption time period to the pulses which form signals on the grid winding X can easily be determined from the voltage pulses induced in the scanning coil 4. This is especially so since the voltage pulses which are in the area of the transition between the charging of one grid winding with pulses, for example the grid winding A, to charging the succeeding grid winding with pulses, for example the grid winding Y, induce a clearly different appearance of voltage pulses in the scanning coil 4.

In spite of this, a certain inaccuracy appears in the course of determining the crossover of the sinusoidal generating curve of an envelope in accordance with FIG. 3. Inaccuracy exists because, among other reasons, unavoidable switching errors cause certain displacements in the course of time of the applied pulses.

To avoid such inaccuracies, it is preferred, as indicated in FIG. 5, to modify the signal sequence with respect to that in FIG. 4. Respectively following the sequential charging of the grid windings X and A, and following the sequential charging of the grid windings Y and B, the grid winding X and the grid winding Y may be charged with pulses $\phi_1$, $\phi_2$ $\phi_3$, and $\phi_4$ in the same way as before, but from the opposite end, as indicated by the sections $\overline{X}$ and $\overline{Y}$ in FIG. 5. This charging takes place via the strip conductors indicated by dashed lines in FIG. 1 and designated as $\overline{X}$ and $\overline{Y}$. Continuation to the other end of the grid winding X or Y takes place below the plane 20 or 21.

The voltage pulses induced by charging the grid winding from the first end (section X in FIG. 5) and by charging the grid winding X from the other end (section $\overline{X}$ in FIG. 5) are each processed in the same way. The crossovers of the generating curves of envelopes illustrated at the middle and bottom of FIG. 3 then are determined, as has been explained previously. If the values for the grid winding X obtained in this manner are averaged, the effect of switching errors or the like will be removed from the value obtained and the exact crossover is obtained.

While a preferred embodiment of the invention has been shown and described, the invention is to be defined by the scope of the appended claims.

I claim:

1. A digitizing device, comprising in combination:
   a digitizing tablet (20,21,22,23), with a first grid winding, comprising an X grid winding for an X coordinate direction and a Y grid winding for a Y coordinate direction; and a second grid winding, comprising an A grid winding for the X coordinate direction and a B grid winding for the Y coordinate direction;
   wherein each of said X, Y, A, and B grid windings comprises a plurality of regularly repeated strip conductor groups, each of said plurality of strip conductor groups comprising a plurality of strip conductors spaced in the associated coordinate direction;
   wherein the first strip conductors of adjoining strip conductor groups of said first and second grid windings further have different spacings in the associated coordinate direction over an entire work surface of said digitizing tablet; and a trigger circuit (1) for triggering said X, Y, A, and B grid windings, said trigger circuit (1) applying a predetermined sequence of periodic signals to said X and A grid windings; so that for a predetermined length of time a first signal is applied to a first end of said X grid winding, and for an immediately following second predetermined period of time, a second signal is applied to a first end of said A grid winding, and wherein immediately following the triggering of said X and A grid windings, said Y and B grid windings are triggered in the same manner; and a scanning coil (4) configured to be placed on said digitizing tablet (20, 21, 22, 23) wherein the signals in said X, Y, A, and B grid windings induce voltages in said scanning coil (4); and an evaluating circuit (10) connected to said scanning coil (4) for detecting a position of said scanning coil (4) on said digitizing tablet (20,21,22,23) in accordance with the voltages induced in said scanning coil (4);

wherein said trigger circuit (1) is associated with said digitizing tablet (20, 21, 22, 23) and said evaluating circuit (10) is associated with said scanning coil (4), so that said trigger circuit (1) and said evaluating circuit (10) are separated galvanically and operate independently of each other;

wherein further an interruption time period Xh is provided between the end of triggering of said Y and B grid windings and the start of triggering of said X and A grid windings, whereby said evaluating circuit (10) determines the start of triggering of said X and A grid windings;

wherein still further said evaluating circuit (10) determines a phase difference of the first and second signals applied to said X and A grid windings, respectively, and a phase difference of the first and second signals applied to said Y and B grid windings, respectively, and determines the position of said scanning coil (4) on said digitizing tablet (20,21,22,23).

2. A digitizing device according to claim 1, wherein said trigger circuit (1) charges said X grid winding with a periodic auxiliary signal during the interruption time period (Xh).

3. A digitizing device according to claim 2, wherein the frequency of the periodic auxiliary signal is approximately one-half of the frequency of the first signal.

4. A digitizing device according to claim 3, wherein said trigger circuit (1) applies a third signal to a second end of said X grid winding for a predetermined length of time immediately following the application of the second signal to said A grid winding, and said trigger circuit (1) applies the third signal to a second end of said Y grid winding for a predetermined length of time immediately following the application of the second signal to said B grid winding.

5. A digitizing device according to claim 4, wherein the form and frequency of the first, second, and third signals and the time periods during which they are applied to said X arid Y grid windings, and said A and B grid windings, and said X and Y grid windings, respectively, are substantially the same.

6. A digitizing device according to claim 5, wherein each time period further comprises four periods of applied signals.

7. A digitizing device according to claim 3, wherein the form and frequency of the first and second signals and the time periods during which they are applied to said X and Y grid windings, and said A and B grid windings, respectively, are substantially the same.

8. A digitizing device according to claim 7, wherein each time period further comprises four periods of applied signals.

9. A digitizing device according to claim 2, wherein said trigger circuit (1) applies a third signal to a second end of said X grid winding for a predetermined length of time immediately following the application of the second signal to said A grid winding, and said trigger circuit (1) applies the third signal to a second end of said Y grid winding for a predetermined length of time immediately following the application of the second signal to said B grid winding.

10. A digitizing device according to claim 9, wherein the form and frequency of the first, second, and third signals and the time periods during which they are applied to said X and Y grid windings, and said A and B grid windings, and said X and Y grid windings, respectively, are substantially the same.

11. A digitizing device according to claim 10, wherein each time period further comprises four periods of applied signals.

12. A digitizing device according to claim 2, wherein the form and frequency of the first and second signals and the time periods during which they are applied to said X and Y grid windings, and said A and B grid windings, respectively, are substantially the same.

13. A digitizing device according to claim 12, wherein each time period further comprises four periods of applied signals.

14. A digitizing device according to claim 1, wherein said trigger circuit (1) applies a third signal to a second end of said X grid winding for a predetermined length of time immediately following the application of the second signal to said A grid winding, and said trigger circuit (1) applies the third signal to a second end of said Y grid winding for a predetermined length of time immediately following the application of the second signal to said B grid winding.

15. A digitizing device according to claim 14, wherein the form and frequency of the first, second, and third signals and the time periods during which they are applied to said X arid Y grid windings, and said A and B grid windings, and said X and Y grid windings, respectively, are substantially the same.

16. A digitizing device according to claim 15, wherein each time period further comprises four periods of applied signals.

17. A digitizing device according to claim 1, wherein the form and frequency of the first and second signals and the time periods during which they are applied to said X and Y grid windings, and said A and B grid windings, respectively, are substantially the same.

18. A digitizing device according to claim 17, wherein each time period further comprises four periods of applied signals.

* * * * *